(12) United States Patent
Nagasaka et al.

(10) Patent No.: US 11,402,297 B2
(45) Date of Patent: Aug. 2, 2022

(54) WEAR DETECTION METHOD AND WEAR DETECTION SYSTEM FOR LINEAR ACTUATOR

(71) Applicant: SINTOKOGIO, LTD., Nagoya (JP)

(72) Inventors: Masahiko Nagasaka, Toyokawa (JP); Hiroyasu Makino, Toyokawa (JP); Katsuaki Odagi, Toyokawa (JP); Tomoyuki Yokomae, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 897 days.

(21) Appl. No.: 16/223,192

(22) Filed: Dec. 18, 2018

(65) Prior Publication Data

US 2019/0195732 A1    Jun. 27, 2019

(30) Foreign Application Priority Data

Dec. 27, 2017 (JP) ............... JP2017-250784

(51) Int. Cl.
*G01M 13/00* (2019.01)
*G01L 5/00* (2006.01)
(Continued)

(52) U.S. Cl.
CPC ............ *G01M 13/00* (2013.01); *F15B 15/20* (2013.01); *F15B 19/005* (2013.01); *F16H 21/40* (2013.01);
(Continued)

(58) Field of Classification Search
None
See application file for complete search history.

(56) References Cited

U.S. PATENT DOCUMENTS 3,977,231 A * 8/1976 Haehner ............... G01N 19/02
                                                        73/9
9,128,008 B2 * 9/2015 Tabor .................. G01M 3/26
(Continued)

FOREIGN PATENT DOCUMENTS

DE    10 2014 225872 A1    6/2016
JP       S51-54400 U       4/1976
(Continued)

OTHER PUBLICATIONS

May 7, 2019 Extended Search Report issued in European Patent Application No. 18 27 5191.7.

*Primary Examiner* — Lina M Cordero
(74) *Attorney, Agent, or Firm* — Oliff PLC

(57) ABSTRACT

A wear detection method and system for a linear actuator such as a pneumatic cylinder, a hydraulic cylinder, an electric cylinder or the like. A physical amount detection sensor 9 is mounted on a linear actuator in which a push-pull member connected to a rod 2 pushes and pulls a pressure-receiving object while applying a lateral load in a direction different from the linear movement direction. An external force that is generated between a tube and the mounting member when the pressure-receiving object is pushed and pulled is detected by the physical amount detection sensor 9 and compared with standard external force data, which was detected in a state without abnormalities and stored in a computation/storage/determination processing device 10, to computationally determine whether the linear actuator is in a normal state or an abnormal state.

8 Claims, 24 Drawing Sheets

(51) Int. Cl.
  *F16H 21/40*   (2006.01)
  *F15B 15/20*   (2006.01)
  *F16H 25/20*   (2006.01)
  *F15B 19/00*   (2006.01)

(52) U.S. Cl.
  CPC ............ *F16H 25/20* (2013.01); *G01L 5/0033* (2013.01); *G01L 5/0038* (2013.01); *F15B 2211/6303* (2013.01); *F15B 2211/6336* (2013.01); *F15B 2211/864* (2013.01); *F15B 2211/87* (2013.01)

(56) References Cited

U.S. PATENT DOCUMENTS

| | | | |
|---|---|---|---|
| 2007/0017300 A1* | 1/2007 | Bushey | G01N 3/02 73/856 |
| 2013/0276516 A1* | 10/2013 | Tabor | G01M 3/26 73/37 |
| 2016/0230789 A1* | 8/2016 | Tabor | F15B 11/10 |
| 2017/0350427 A1* | 12/2017 | Leinonen | F15B 19/007 |
| 2021/0310504 A1* | 10/2021 | Tabor | G01M 99/008 |

FOREIGN PATENT DOCUMENTS

| | | |
|---|---|---|
| JP | H06-123044 A | 5/1994 |
| JP | 2015-209312 A | 11/2015 |
| WO | 2016/092150 A1 | 6/2016 |

\* cited by examiner

[FIG. 1]
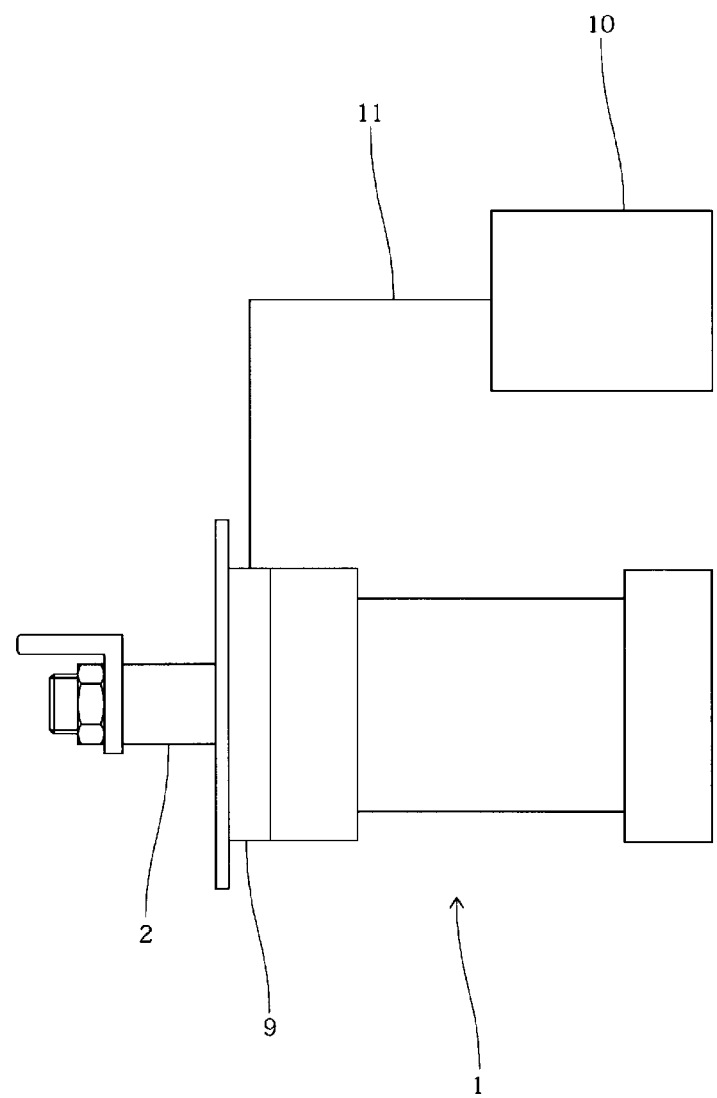

[FIG. 2]
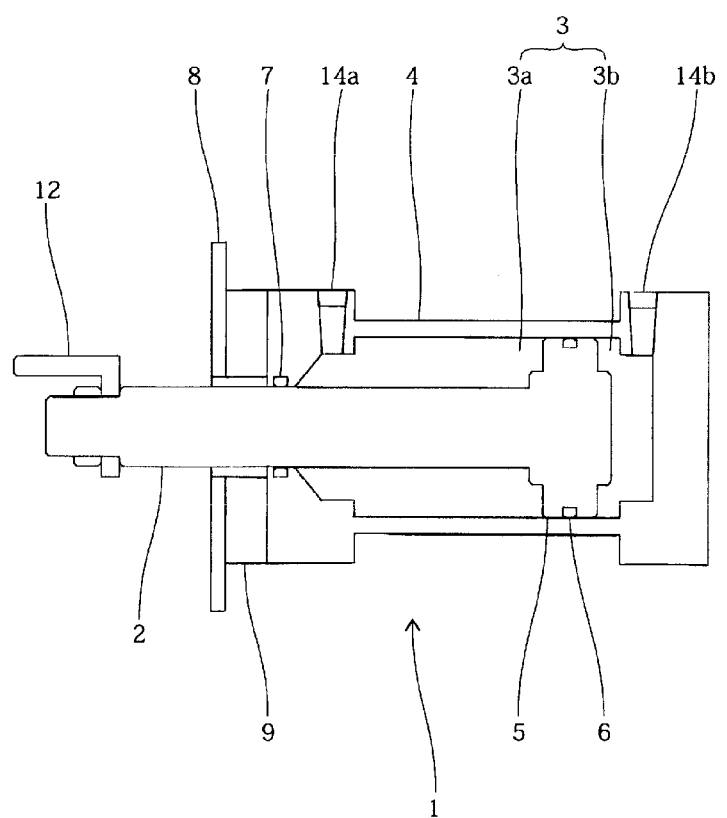

[FIG. 3]
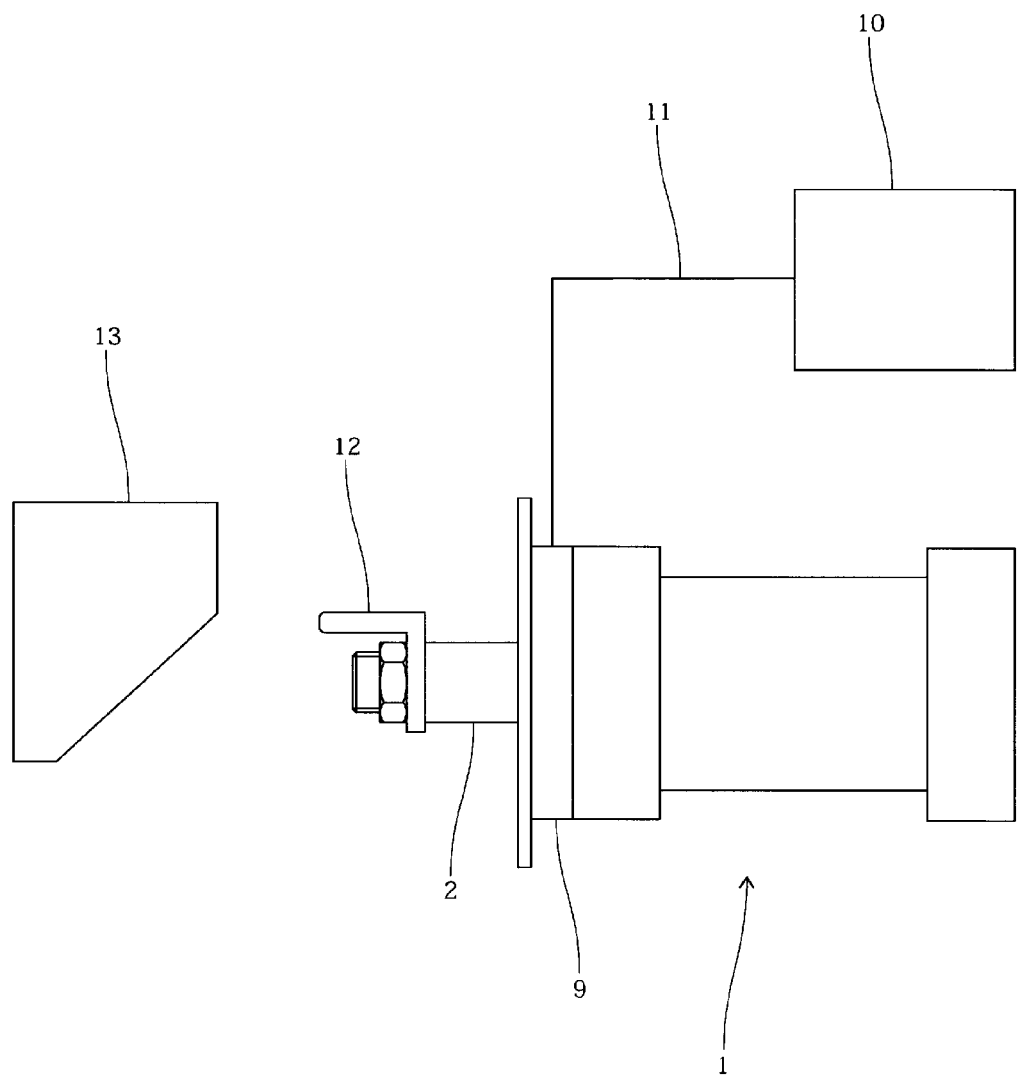

[FIG. 4]
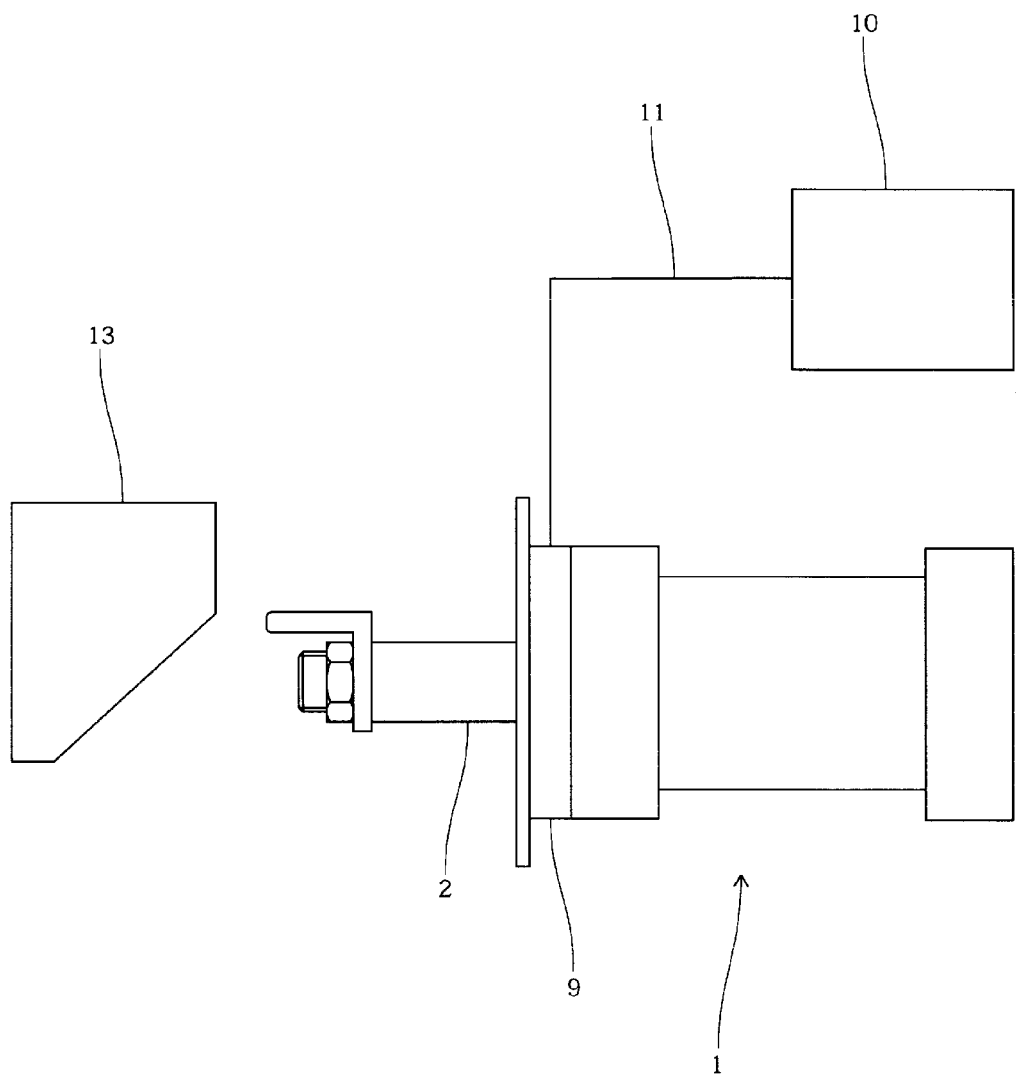

[FIG. 5]
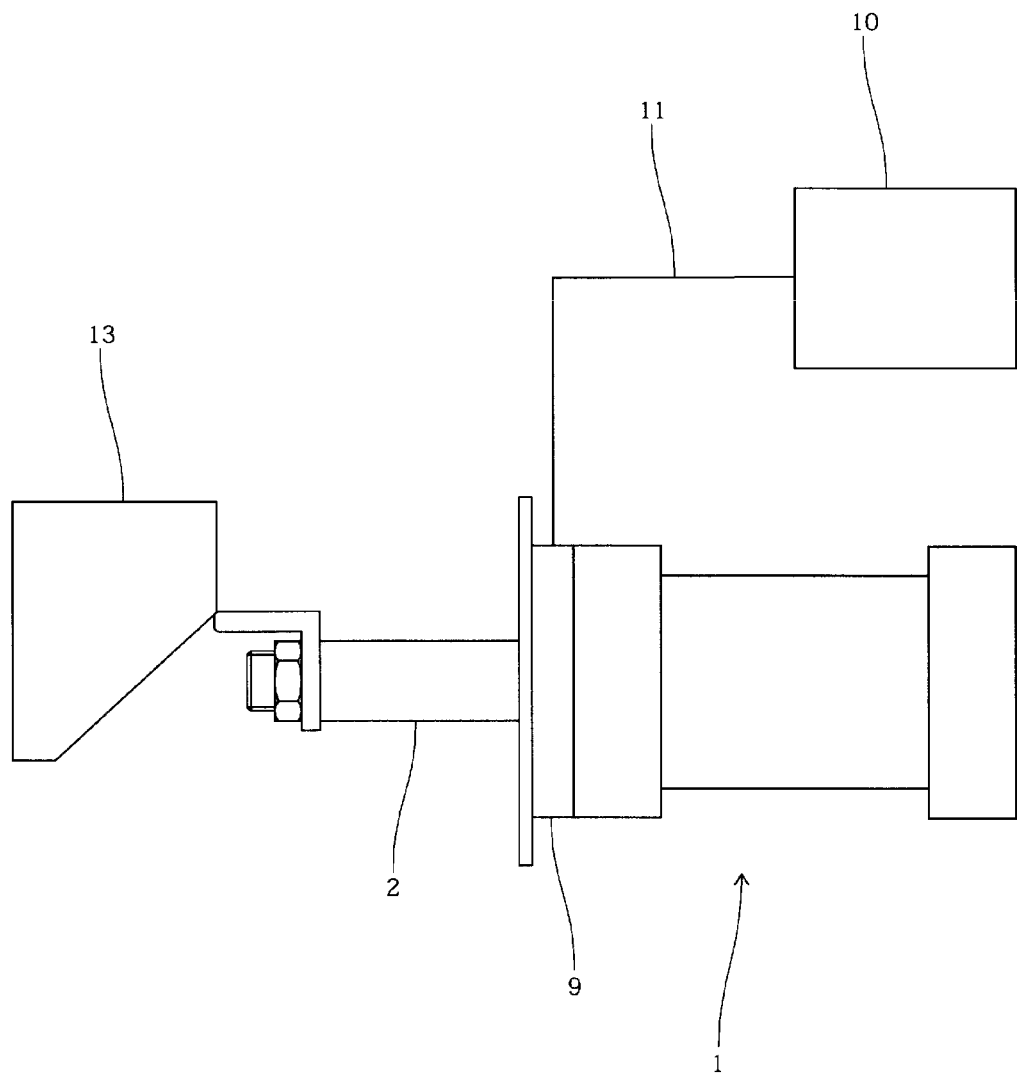

[FIG. 6]
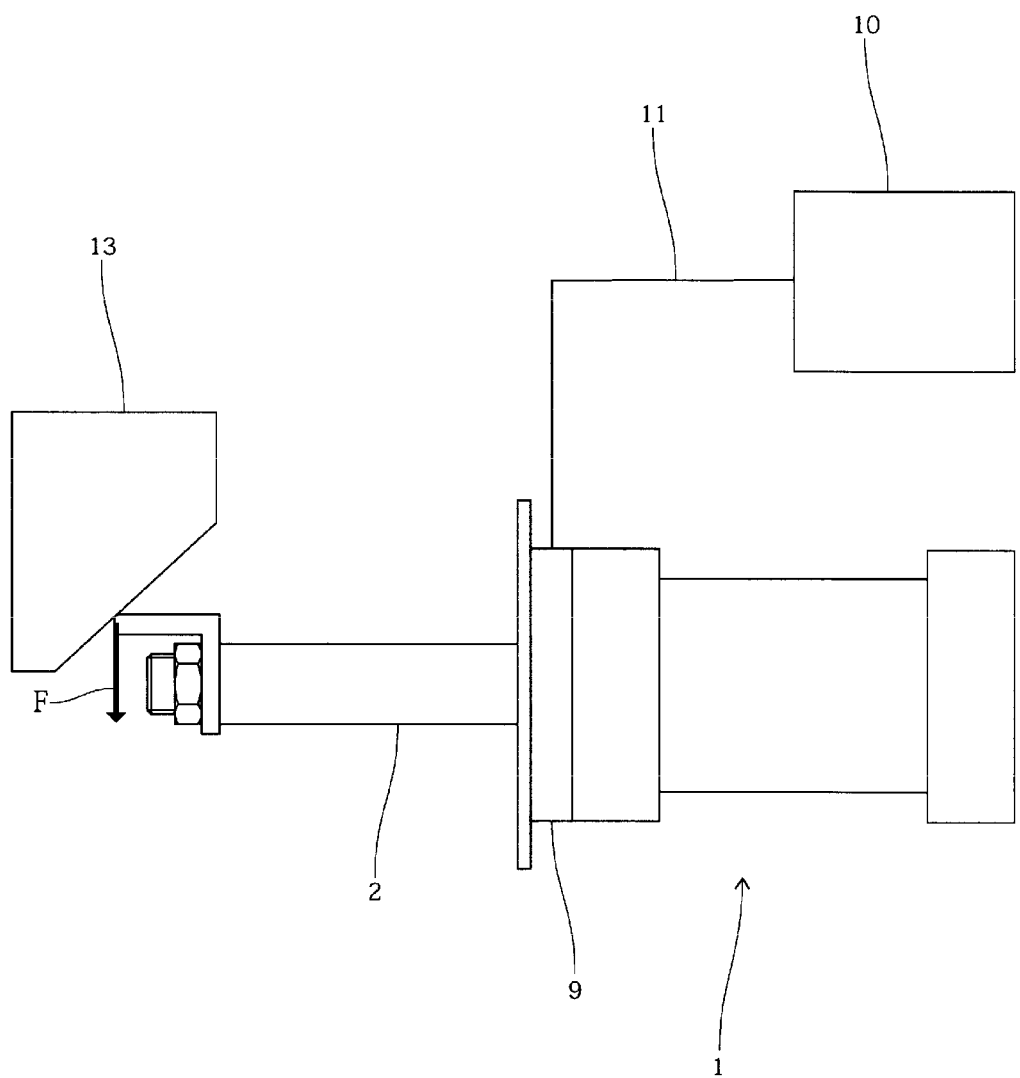

[FIG. 7]
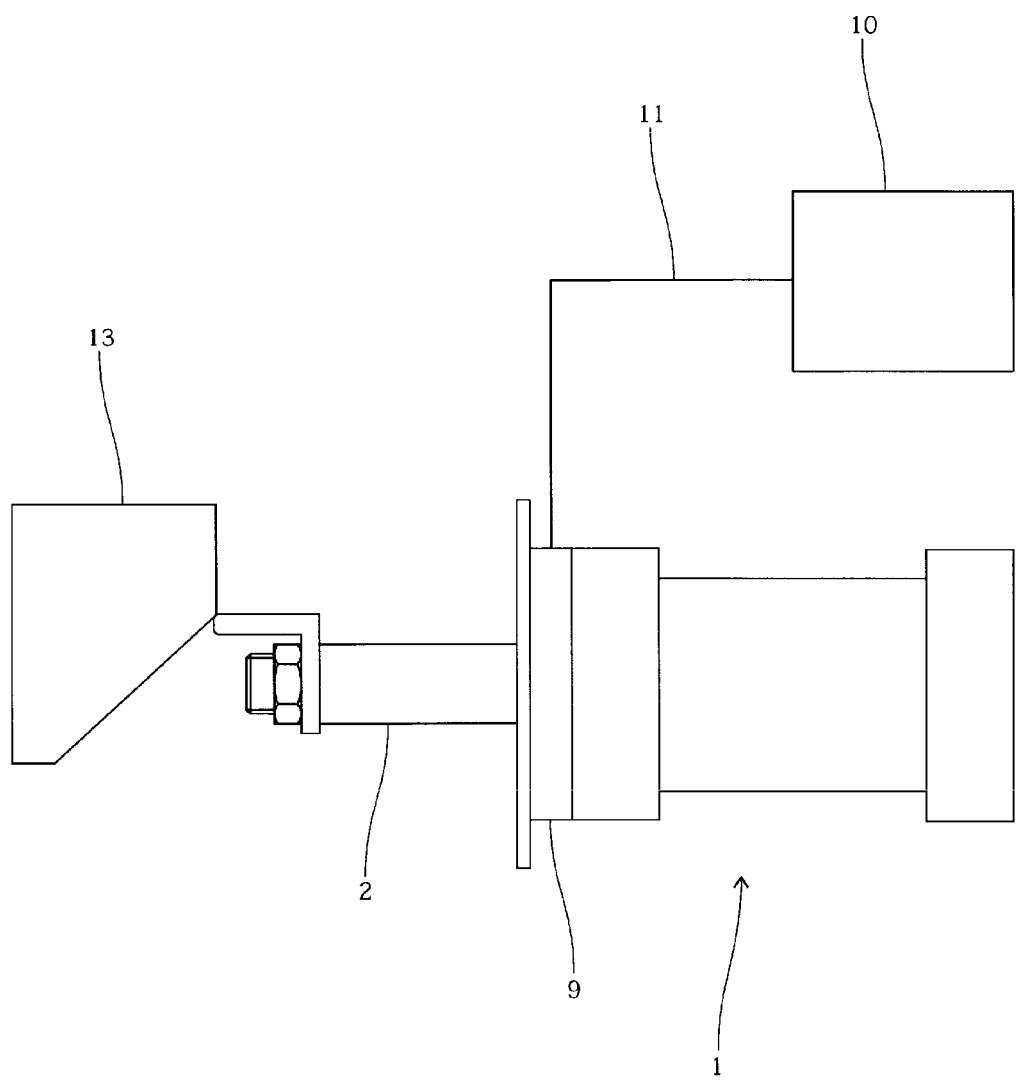

[FIG. 8]
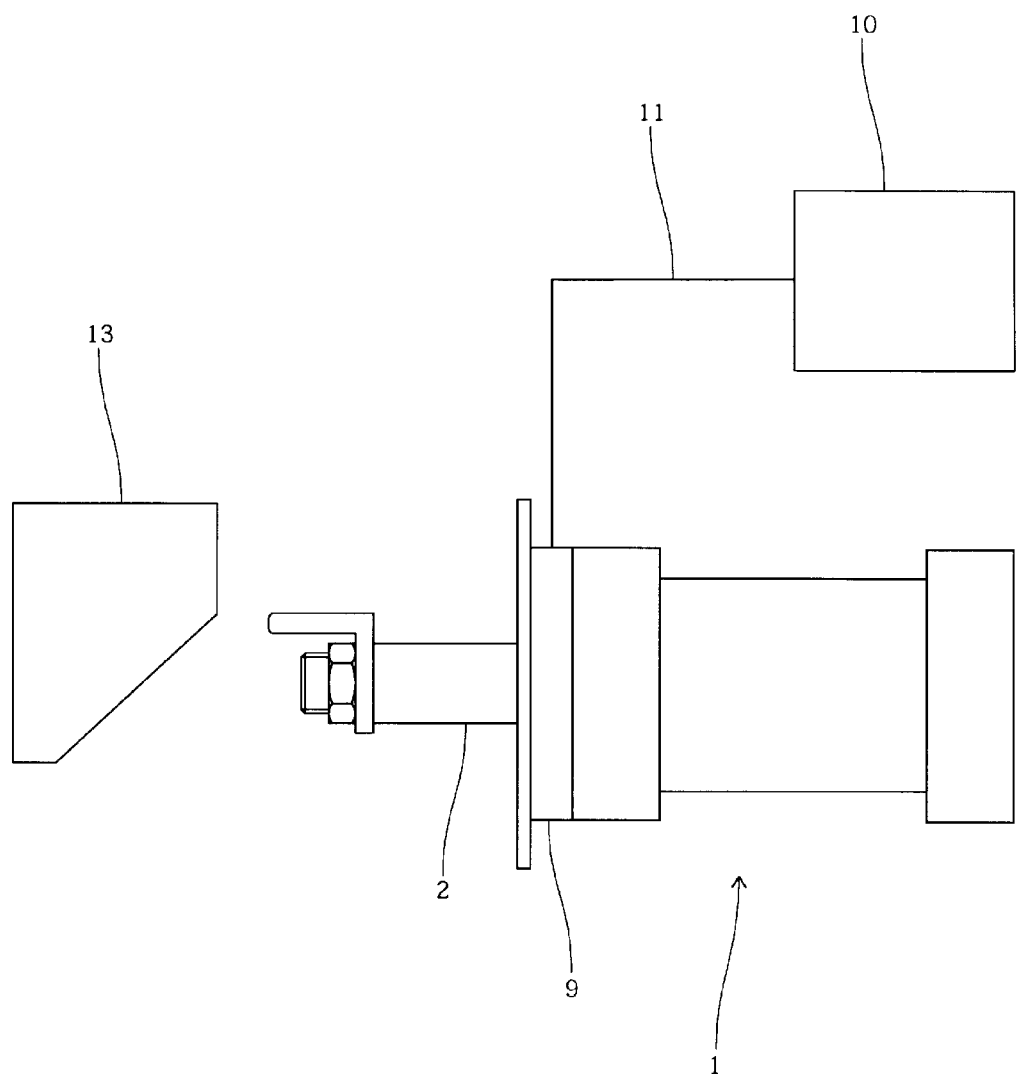

[FIG. 9]
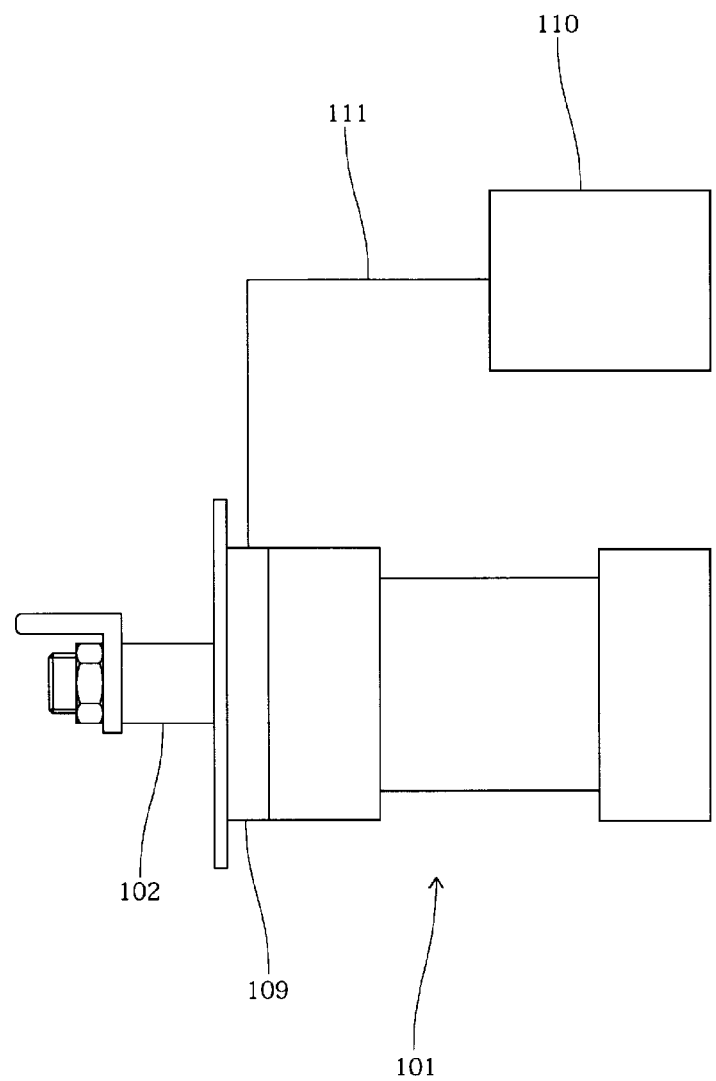

[FIG. 10]
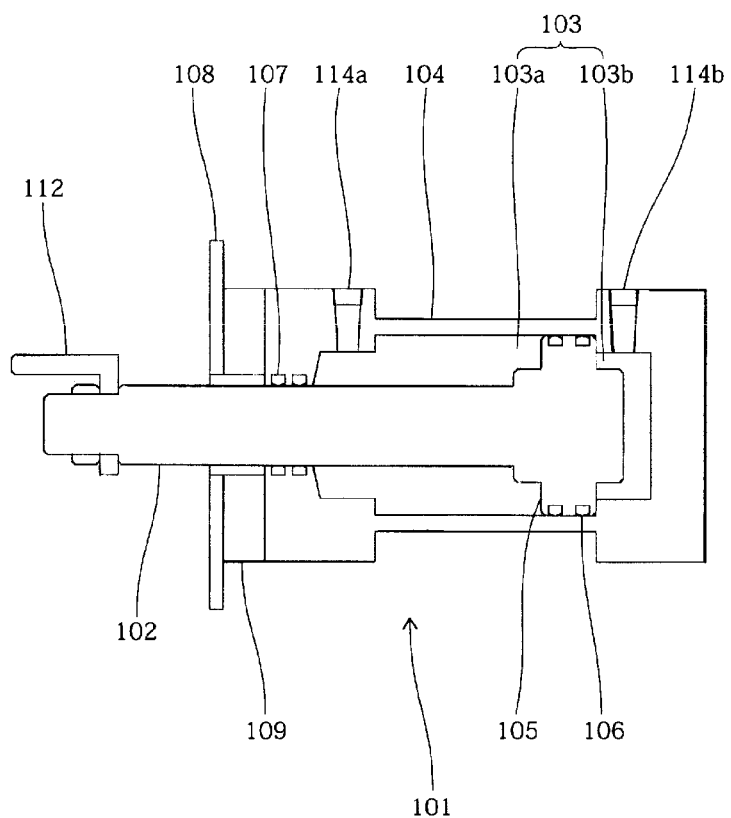

[FIG. 11]
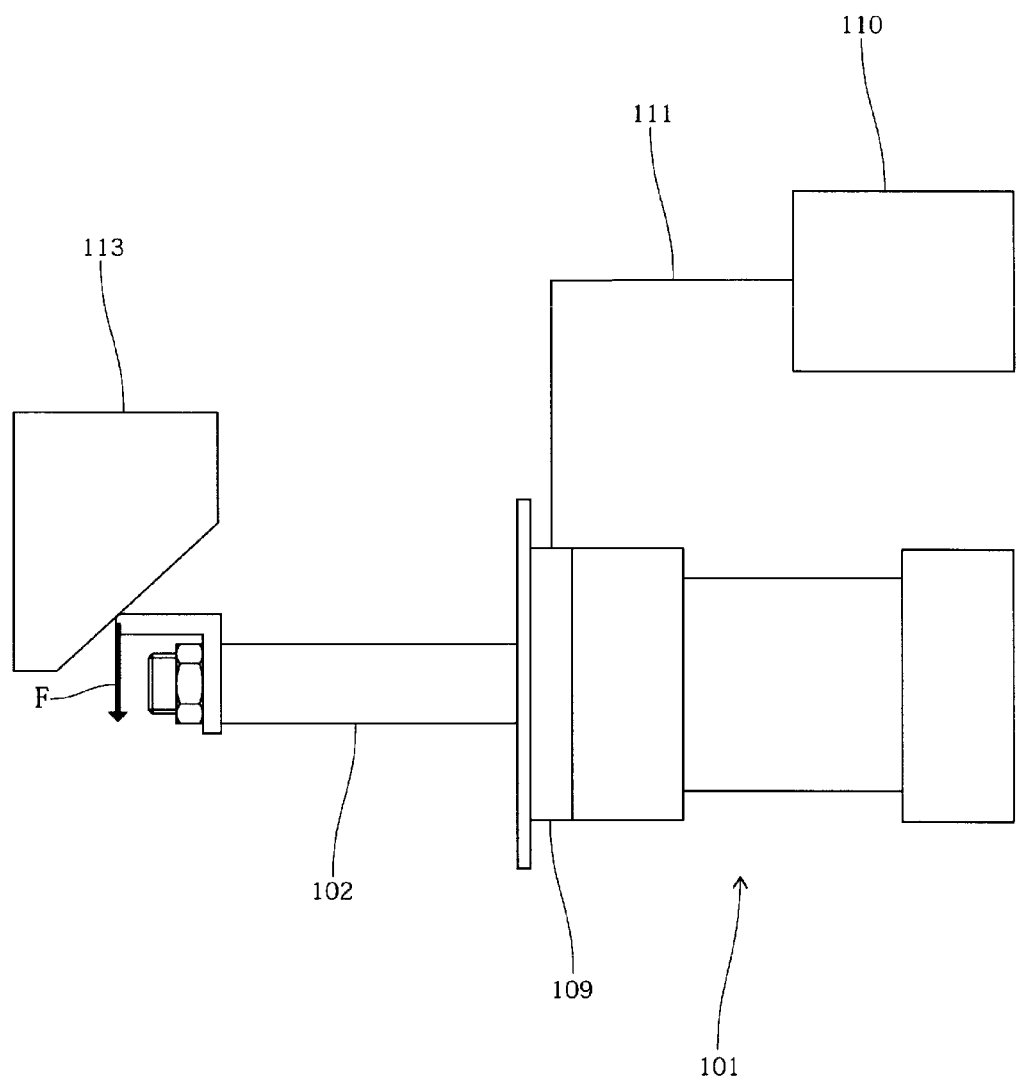

[FIG. 12]
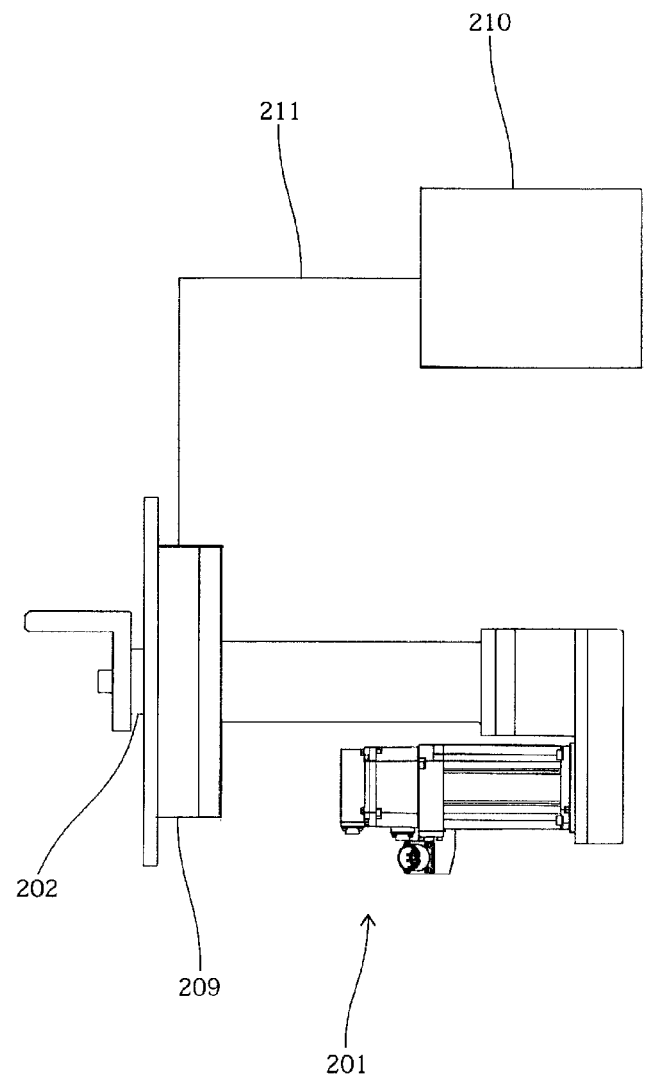

[FIG. 13]
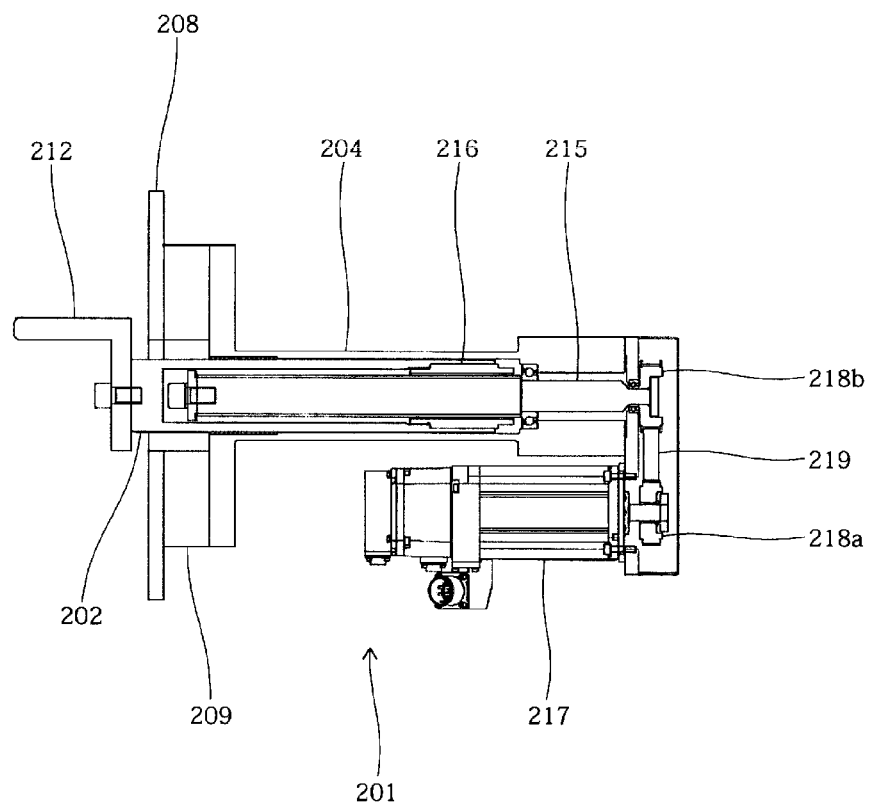

[FIG. 14]
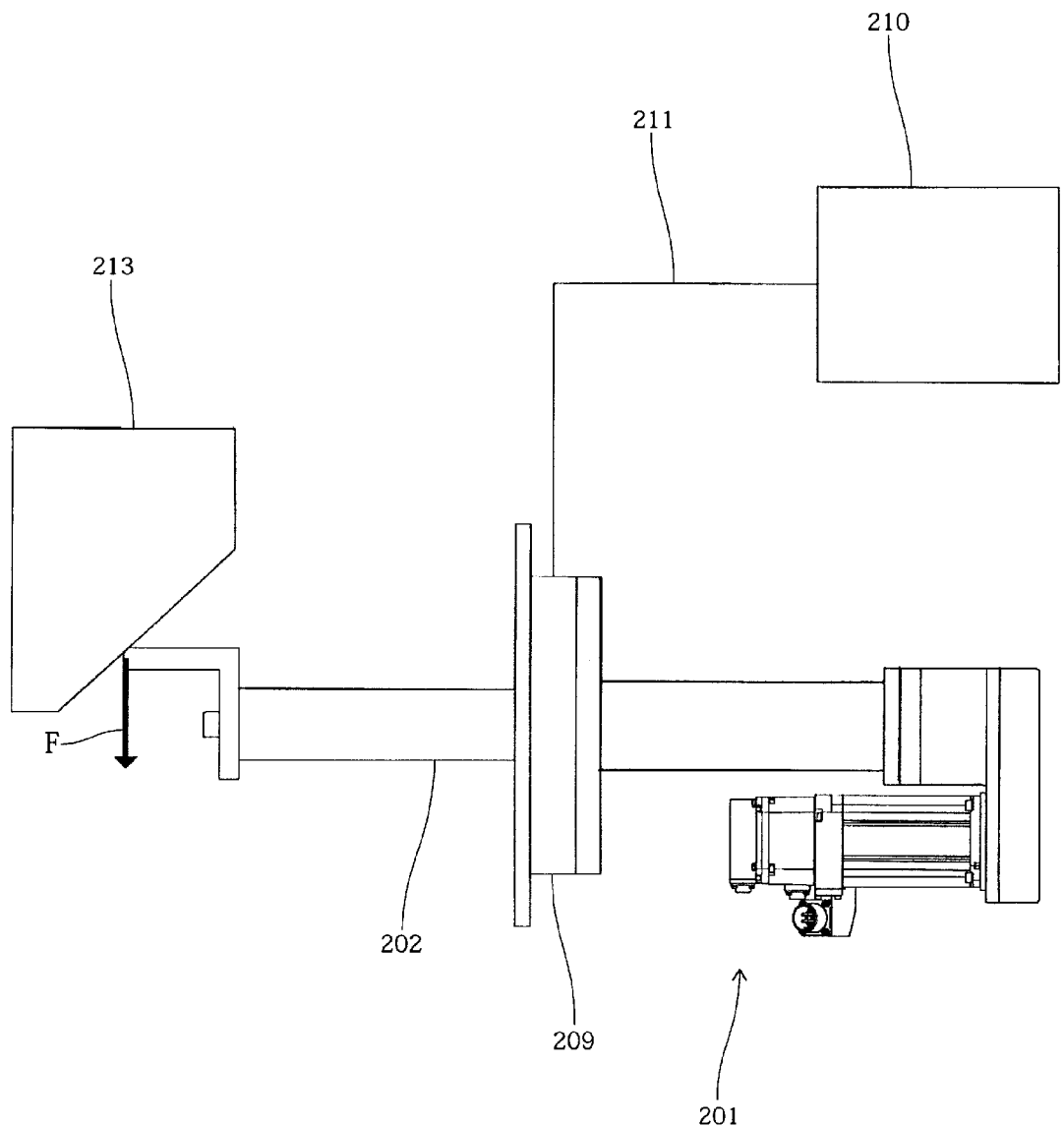

[FIG. 15]
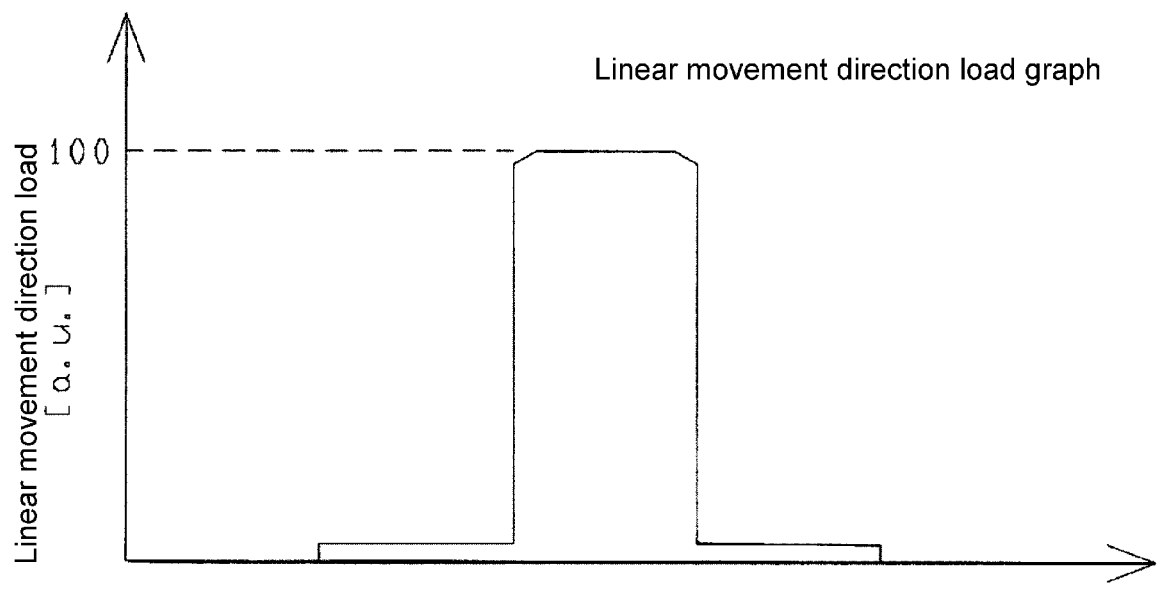
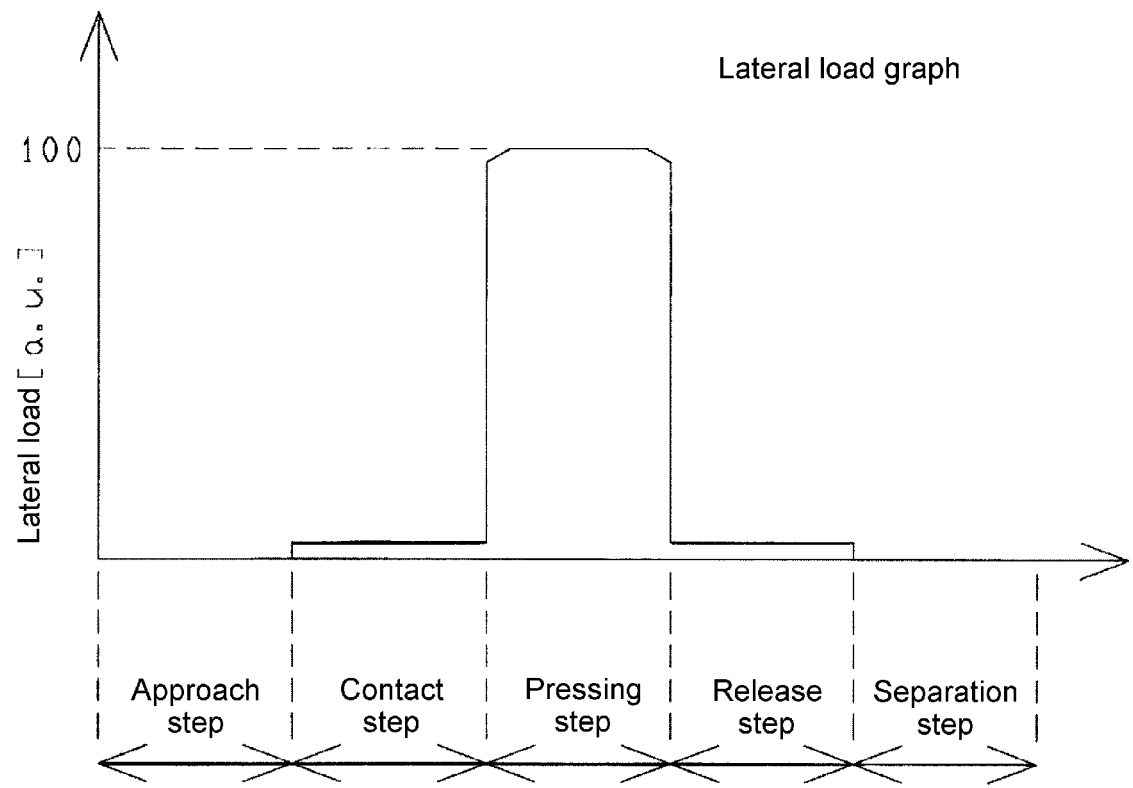

[FIG. 16]
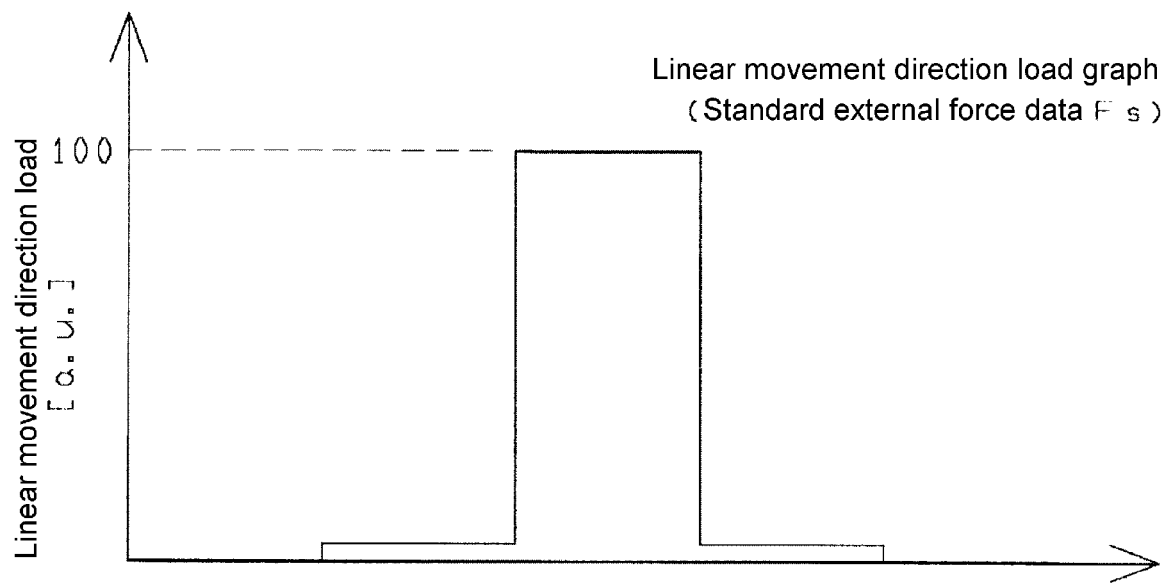
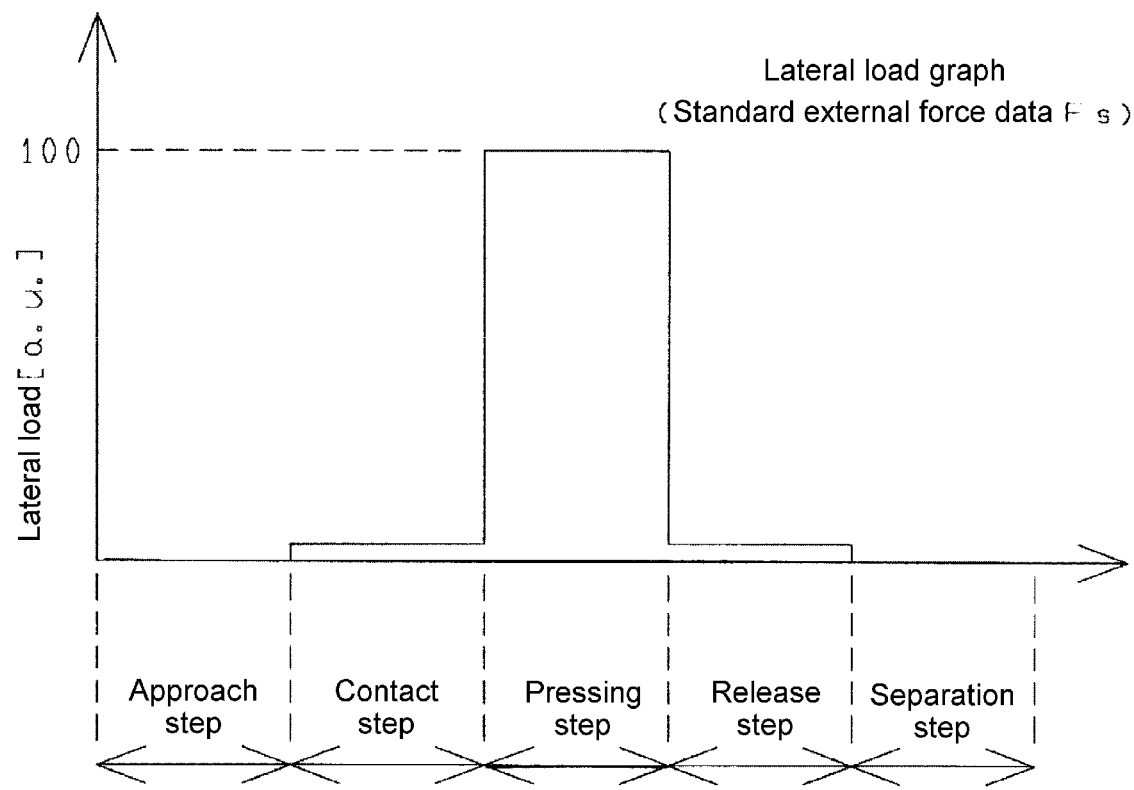

[FIG. 17]
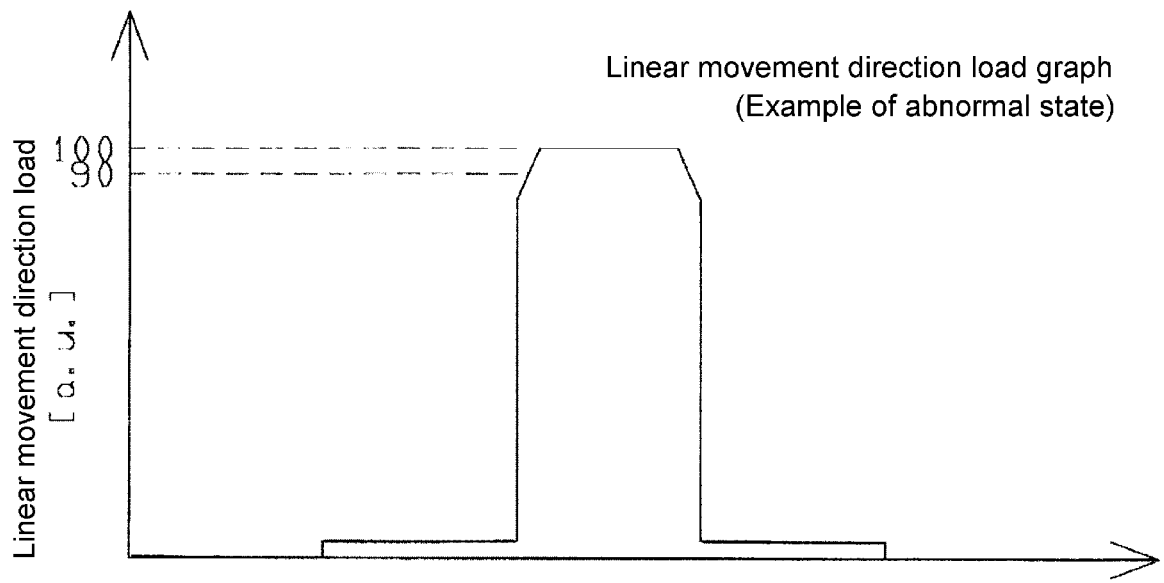
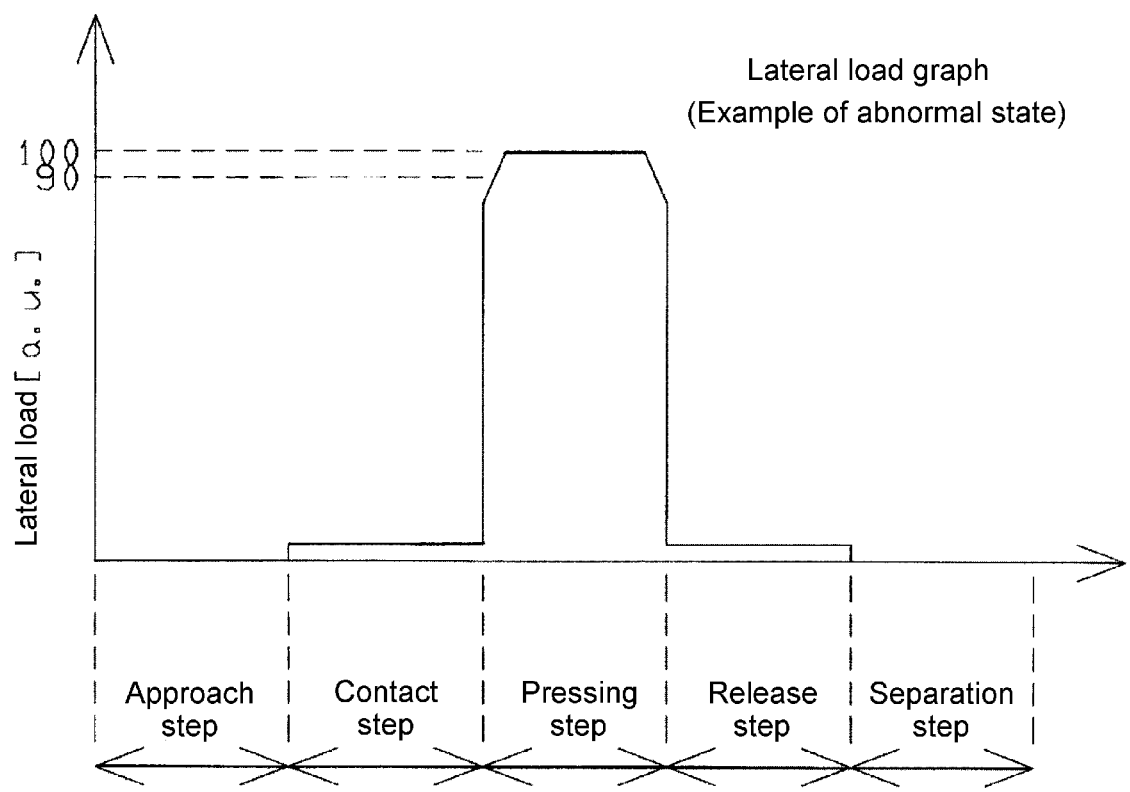

[FIG. 18]
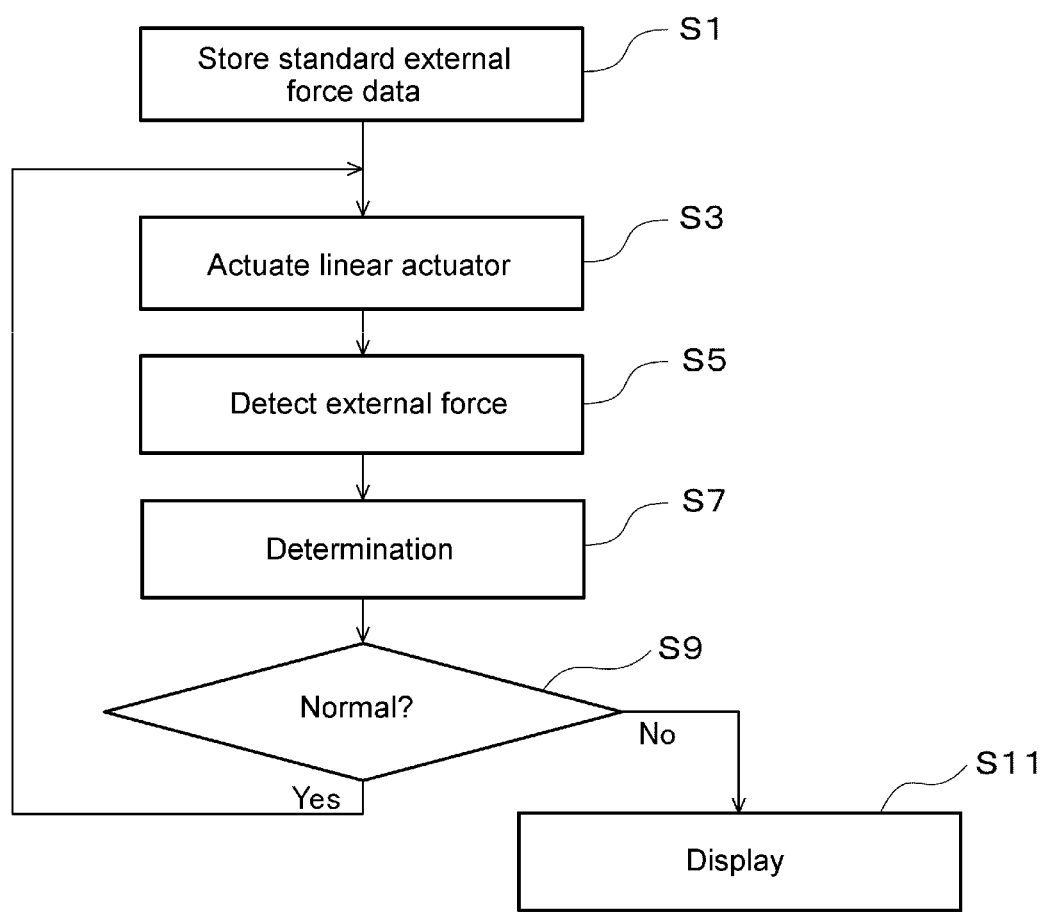

[FIG. 19]
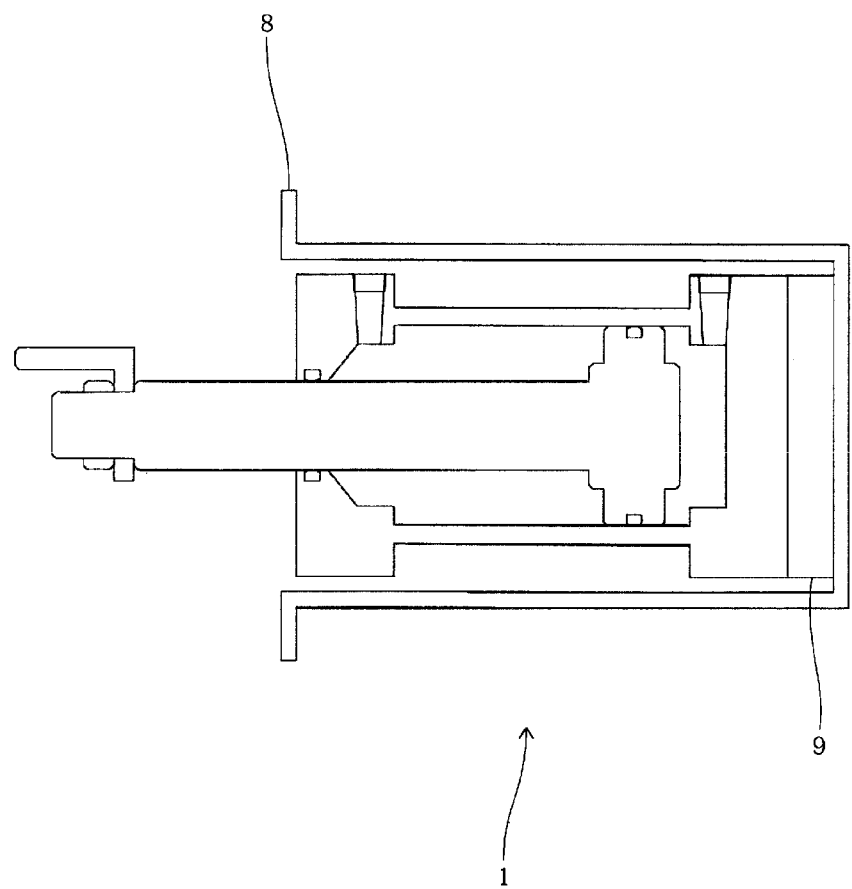

[FIG. 20]
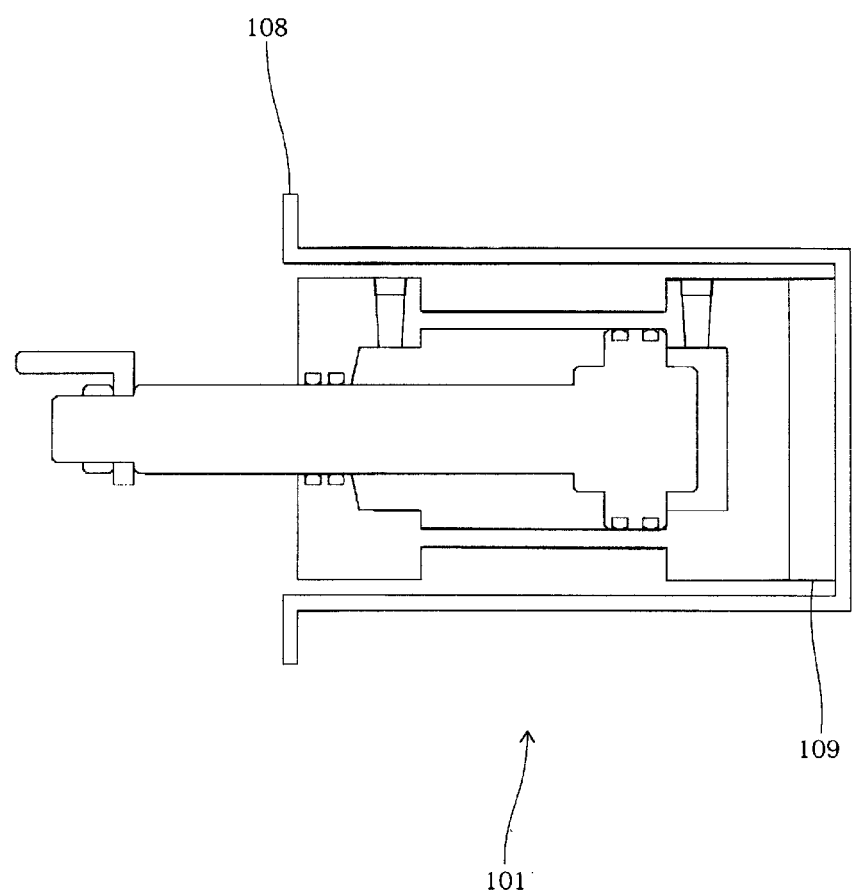

[FIG. 21]
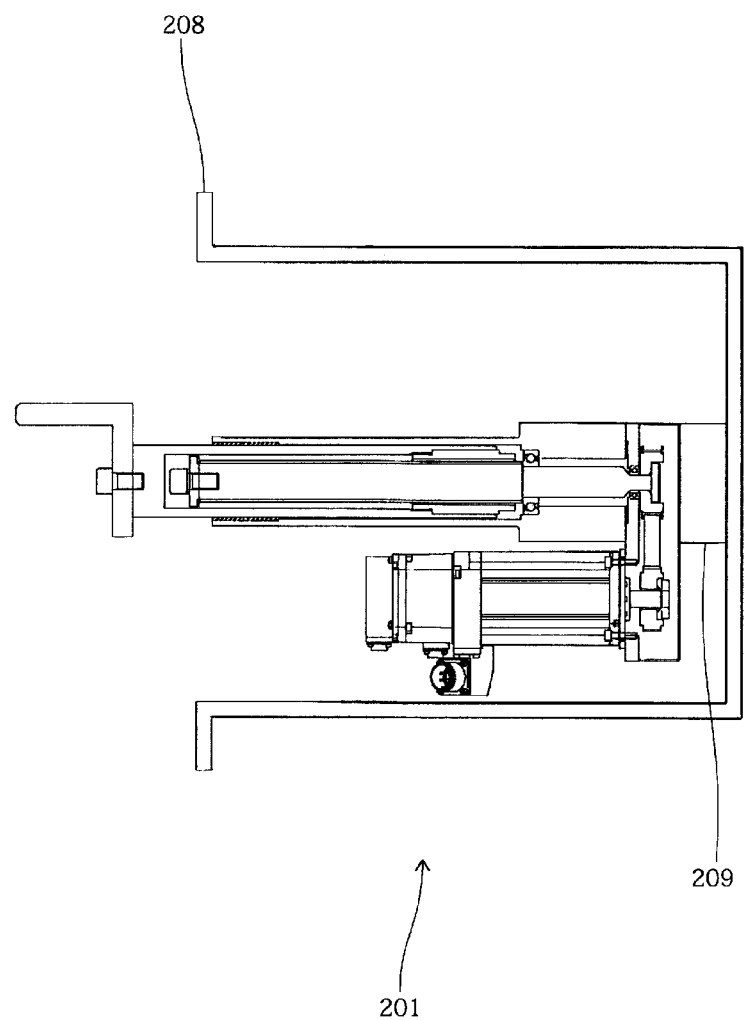

[FIG. 22]
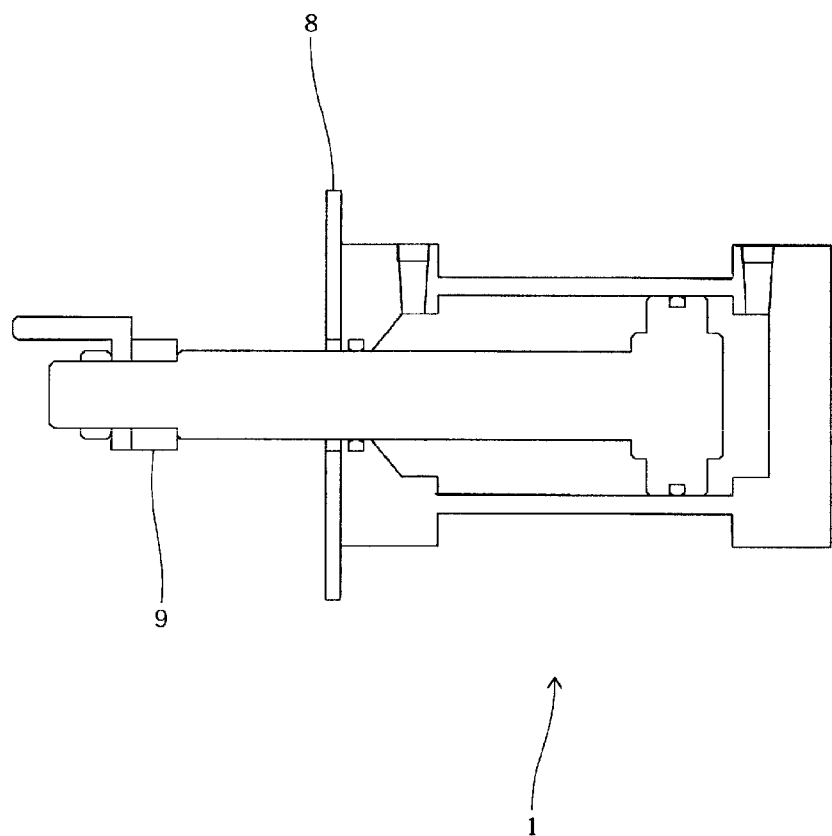

[FIG. 23]
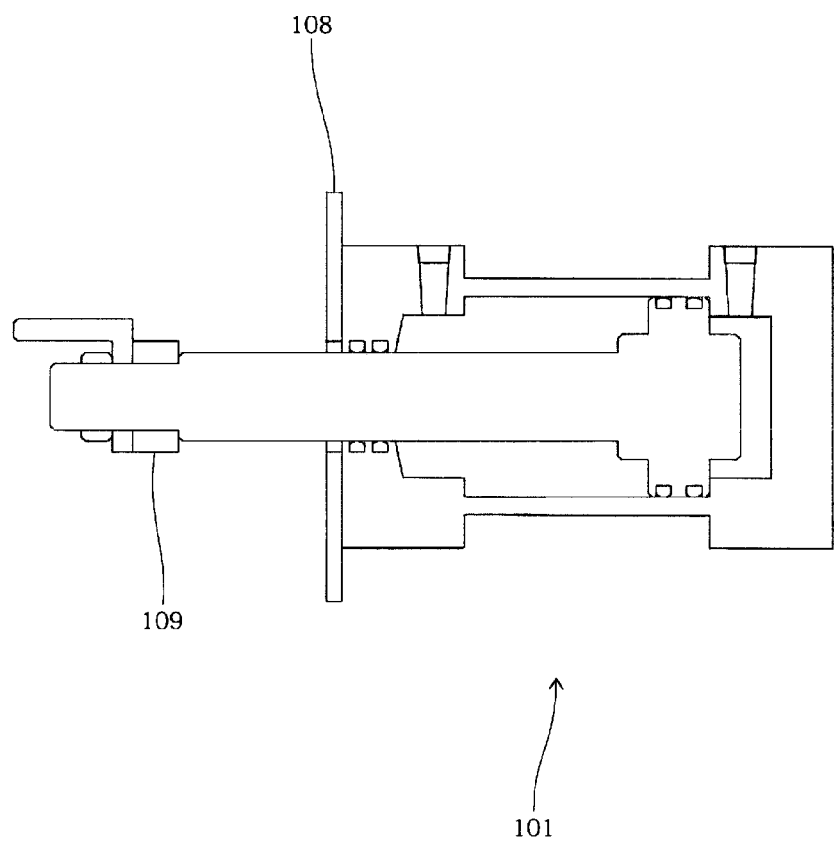

[FIG. 24]
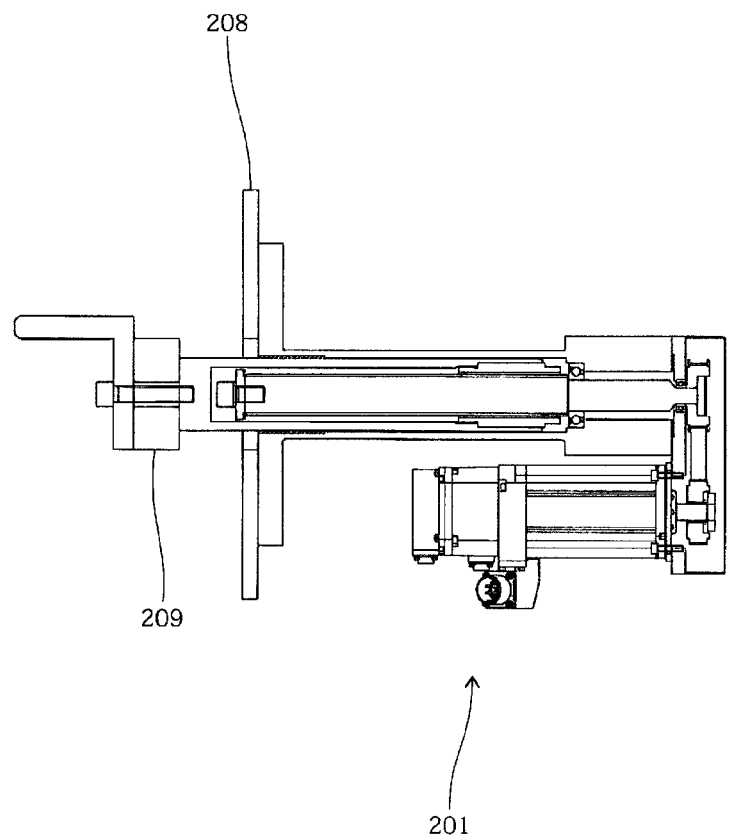

WEAR DETECTION METHOD AND WEAR DETECTION SYSTEM FOR LINEAR ACTUATOR

TECHNICAL FIELD

The present invention relates to a wear detection method and a wear detection system for a linear actuator such as a pneumatic cylinder, a hydraulic cylinder, an electric cylinder or the like.

BACKGROUND

Conventionally, when using linear actuators such as pneumatic cylinders, hydraulic cylinders and electric cylinders, they may be used in a manner in which a so-called lateral load is applied to movable parts of the linear actuator in a direction different from the linear movement direction (for example, Patent Documents 1, 2 and 3). However, if used in such a manner, an excessive lateral load may be applied to some of the components in the linear actuator. In the case of a pneumatic cylinder, wear occurs when an excessive lateral load is applied to a rod, which is a linearly movable part, a packing at a rod insertion portion, a piston portion coupled to the rod, a packing in the piston portion, a cylinder tube or the like, thereby causing air leaks. Similarly, in the case of a hydraulic cylinder, wear occurs when an excessive lateral load is applied to a rod, which is a linearly movable part, a packing at a rod insertion portion, a piston portion coupled to the rod, a packing in the piston portion, a cylinder tube or the like, thereby causing oil leaks. Similarly, in the case of an electric cylinder, wear occurs when an excessive lateral load is applied to a rod, which is a linearly movable part, a packing at a rod insertion portion, a ball screw nut portion coupled to the rod, a ball screw for converting rotational motion to linear motion, a cylinder tube or the like, thereby causing reduced precision in the stopping position. There was a problem in that the continued use of a linear actuator in a state of being worn by an excessive lateral load could lead to many types of trouble, such as trouble in the equipment in which the linear actuator is installed itself, trouble along a line including that equipment, or trouble in the quality of products manufactured by using that equipment.

CITATION LIST

Patent Literature

[Patent Document 1] JP S51-54400 U
[Patent Document 2] JP 2015-209312 A
[Patent Document 3] JP H6-123044 A

SUMMARY OF INVENTION

Technical Problem

Thus, the present invention was made in order to prevent the many types of trouble caused by the continued use of linear actuators in a state of being worn by excessive lateral loads as described above, and has the purpose of providing a method and system for automatically detecting wear due to excessive lateral loads in linear actuators before many types of trouble occur.

Solution To Problem

In order to achieve the above-mentioned purpose, the present invention uses technical means wherein a wear detection method for a linear actuator that comprises a rod capable of moving linearly inside a tube mounted on a mounting member, and that pushes and pulls a pressure-receiving object while a push-pull member connected to the rod applies a lateral load in a direction different from the linear movement direction, comprises a storage step of pre-detecting, with a physical amount detection sensor, an external force generated between the mounting member and the tube when the pressure-receiving object is pushed and pulled in a state without abnormalities, and storing the external force, as standard external force data, in a computation/storage/determination processing device; and a determination step of detecting, with the physical amount detection sensor, an external force generated between the mounting member and the tube when the pressure-receiving object is pushed and pulled, and computationally determining whether the linear actuator is in a normal state or an abnormal state by comparing the detected external force data with the standard external force data stored in the computation/storage/determination processing device. It is preferable to use a force sensor as the physical amount detection sensor.

One embodiment of the present invention uses a technical means wherein, during the determination step, an average value of external force data for an immediately preceding plurality of steps is compared with the detected external force data, and the linear actuator is also determined as being in an abnormal state when the detected external force data is outside a preset tolerance range with respect to the average value.

Additionally, a wear detection system for a linear actuator of the present invention uses a technical means wherein the wear detection system for a linear actuator that comprises a rod capable of moving linearly inside a tube mounted on a mounting member, and that pushes and pulls a pressure-receiving object while a push-pull member connected to the rod applies a lateral load in a direction different from the linear movement direction, comprises a physical amount detection sensor that detects an external force generated between the mounting member and the tube when the pressure-receiving object is pushed and pulled; and a computation/storage/determination processing device that stores, as standard external force data, an external force detected by the physical amount detection sensor in a state without abnormalities, and that computationally determines whether the linear actuator is in a normal state or an abnormal state by comparing, with the standard external force data, external force data detected in the physical amount detection sensor when the pressure-receiving object is pushed and pulled. It is preferable to use a force sensor as the physical amount detection sensor.

In one embodiment of the present invention, the linear actuator is a pneumatic cylinder, a hydraulic cylinder or an electric cylinder.

Advantageous Effects of Invention

According to the present invention, it is possible to automatically detect wear due to excessive lateral loads in a linear actuator before many types of trouble occur due to continued use of the linear actuator in a state of being worn by the excessive lateral loads. As a result, while there was a problem in that the continued use of a linear actuator in a state of being worn by excessive lateral loads could lead to many types of trouble, such as trouble in the equipment in which the linear actuator is installed itself, trouble along a line including that equipment, or trouble in the quality of products manufactured by using that equipment, said problem can be prevented before it occurs.

Additionally, in the case where the linear actuator is a pneumatic cylinder, problems such as air leaks due to component wear could occur, but such problems can be prevented before they occur. In the case where the linear actuator is a hydraulic cylinder, problems such as oil leaks due to component wear could occur, but such problems can be prevented before they occur. In the case where the linear actuator is an electric cylinder, problems such as reduced precision in the stopping position due to component wear could occur, but such problems can be prevented before they occur.

BRIEF DESCRIPTION OF DRAWINGS

FIG. 1 is an explanatory plan view of a pneumatic cylinder according to a first embodiment.

FIG. 2 is an explanatory section view of the pneumatic cylinder according to the first embodiment.

FIG. 3 is an explanatory plan view of the first embodiment when the rod is the most contracted.

FIG. 4 is an explanatory plan view of the first embodiment during an approach step.

FIG. 5 is an explanatory plan view of the first embodiment during a contact step.

FIG. 6 is an explanatory plan view of the first embodiment during a pressing step.

FIG. 7 is an explanatory plan view of the first embodiment during a release step.

FIG. 8 is an explanatory plan view of the first embodiment during a separation step.

FIG. 9 is an explanatory plan view of a hydraulic cylinder according to a second embodiment.

FIG. 10 is an explanatory section view of the hydraulic cylinder according to the second embodiment.

FIG. 11 is an explanatory plan view of the second embodiment during a pressing step.

FIG. 12 is an explanatory plan view of an electric cylinder according to a third embodiment.

FIG. 13 is an explanatory section view of the electric cylinder according to the third embodiment.

FIG. 14 is an explanatory plan view of the third embodiment during a pressing step.

FIG. 15 is a graph showing an external force detected by a physical amount detection sensor.

FIG. 16 is a graph showing a standard external force stored in a computation/storage/determination processing device.

FIG. 17 is a graph showing an external force detected by a physical amount detection sensor when a linear actuator is in an abnormal state.

FIG. 18 is a flow chart of the wear detection method for a linear actuator according to the first, second and third embodiments.

FIG. 19 is an explanatory section view of a modified example of a pneumatic cylinder.

FIG. 20 is an explanatory section view of a modified example of a hydraulic cylinder.

FIG. 21 is an explanatory section view of a modified example of a electric cylinder.

FIG. 22 is an explanatory section view of a modified example of a pneumatic cylinder.

FIG. 23 is an explanatory section view of a modified example of a hydraulic cylinder.

FIG. 24 is an explanatory section view of a modified example of a electric cylinder.

DESCRIPTION OF EMBODIMENTS

First Embodiment

Hereinbelow, a first embodiment of the present invention wherein the linear actuator is a pneumatic cylinder will be explained with reference to the drawings. As shown in FIGS. 1 and 2, the pneumatic cylinder 1, which is a linear actuator, comprises a linearly movable rod 2; a tube 4 having two air spaces 3, i.e., a first air space 3a and a second air space 3b, in the interior thereof; a piston 5 that is joined to the rod 2 and that divides the air space 3 into the first air space 3a and the second air space 3b; a packing 6 that is provided around the perimeter of the piston 5 so as to be able to slide along the inner walls of the tube 4, and that is arranged so that air will not leak between the first air space 3a and the second air space 3b divided by the piston 5; a gland packing 7 that is provided on the side of the tube 4 from which the rod 2 protrudes, and that is arranged so as to allow the rod 2 to slide into and out of the interior of the tube 4 and so that air in the first air space 3a will not leak to the outside; a mounting member 8 for mounting and fixing the pneumatic cylinder 1 to a casing, a frame or the like in equipment in which it is to be provided; and a physical amount detection sensor 9 for detecting an external force generated between the mounting member 8 and the tube 4. It is preferable to use a force sensor as the physical amount detection sensor 9.

The wear detection system for the pneumatic cylinder 1 comprises a computation/storage/determination processing device 10 for performing computation, storage or determination processes using signals detected by the physical amount detection sensor 9. A signal line 11 for transmitting signals detected by the physical amount detection sensor 9 to the computation/storage/determination processing device 10 is connected between the physical amount detection sensor 9 and the computation/storage/determination processing device 10.

A push-pull member 12 is connected to the rod 2 and is able to move in unison therewith. As shown in FIGS. 3 and 4, this push-pull member 12 pushes and pulls a pressure-receiving object 13. In such a method of use, when the rod 2 advances and retreats, a lateral load F in a direction different from the linear movement direction is applied to the rod 2, as shown in FIG. 6.

First, in the state in which there are no abnormalities in the pneumatic cylinder 1, the external force that is generated, when pushing and pulling the pressure-receiving object 13, between the mounting member 8 for supporting the pneumatic cylinder 1 and the tube 4 on which the force of the rod 2 pushing and pulling the pressure-receiving object 13 acts is pre-detected by the physical amount detection sensor 9, and is stored in the computation/storage/determination processing device 10 as standard external force data Fs (storage step). Then, as the pneumatic cylinder 1 is repeatedly used, in a state in which it is unclear whether or not the pneumatic cylinder 1 is in a normal state, the external force that is generated between the mounting member 8 and the tube 4 when the pressure-receiving object 13 is pushed and pulled is detected by the physical amount detection sensor 9. The detected external force data F is compared with the standard external force data Fs stored in the computation/storage/determination processing device 10 and it is determined whether or not the pneumatic cylinder 1 is in a normal state or an abnormal state (determination step). Wear detection is performed in the pneumatic cylinder 1, which is a linear actuator, in this manner. The actions of the pneumatic cylinder in this first embodiment will be explained in further detail.

First, compressed air at a pressure of 0.5 MPa supplied from a compressed air supply source (not shown) is supplied through an air hose (not shown) and through a second air space air supply hole 14b shown in FIG. 2 to the second air space 3b. Then, the pressure difference causes the air in the first air space 3a to pass through the first air space air supply hole 14a and to be discharged to the outside of the tube 4, while simultaneously, the piston 5 moves in the direction from the second air space 3b towards the first air space 3a, and the rod 2 connected to the piston 5 extends so as to be pushed out from inside the tube 4.

Then, the push-pull member 12 that is screwed onto the tip of the rod 2 and that can move in unison therewith approaches the pressure-receiving object 13 as the rod 2 is extended. This step is shown in FIG. 4 and is defined as the approach step.

Subsequently, the push-pull member 12 and the pressure-receiving object 13 come into contact. This step is shown in FIG. 5 and is defined as the contact step.

Subsequently, the push-pull member 12 pushes against the pressure-receiving object 13. This step is shown in FIG. 6 and is defined as the pressing step.

Next, compressed air at a pressure of 0.5 MPa supplied from a compressed air supply source (not shown) is supplied through an air hose (not shown) and through a first air space air supply hole 14a to the first air space 3a. Then, the pressure difference causes the air in the second air space 3b to pass through the second air space air supply hole 14b and to be discharged to the outside of the tube 4, while simultaneously, the piston 5 moves in the direction from the first air space 3a towards the second air space 3b, and the rod 2 connected to the piston 5 is drawn back so as to be received inside the tube 4.

Then, the push-pull member 12 that is screwed onto the tip of the rod 2 and that can move in unison therewith moves in a direction away from the pressure-receiving object 13 as the rod 2 is drawn back, and the push-pull member 12 and the pressure-receiving object 13 are released from the state of contact. This step is shown in FIG. 7 and is defined as the release step.

Subsequently, the push-pull member 12 is released from the pressure-receiving object 13 and moves farther away so that the separation distance increases. This step is shown in FIG. 8 and is defined as the separation step.

The linear-direction load that is generated on the push-pull member 12 in the linear direction and the lateral load F that is generated in a lateral direction different from the linear direction during the respective steps in the series of actions at this time are shown in FIG. 15.

The lateral load F generated on the push-pull member 12 in a direction different from the linear movement direction, shown in FIG. 15, can be detected indirectly by the physical amount detection sensor 9 for detecting the external force generated between a mounting flange 8, which is a mounting member for supporting the pneumatic cylinder 1, and the tube 4 on which the force of the rod 2 for pushing and pulling the pressure-receiving object 13 acts.

Furthermore, the standard external force data Fs shown in FIG. 16 is data relating to the load that is applied to the push-pull member acquired when the pneumatic cylinder is in the normal state, such as when the pneumatic cylinder 1 is newly installed, or immediately after replacement or maintenance. This data is acquired beforehand and stored in the computation/storage/determination processing device 10. This step of storing the standard external force data Fs is defined as the storage step.

As the action of using the driving force of the pneumatic cylinder 1 to press the pressure-receiving object 13 with the push-pull member 12 is repeated, it becomes unclear whether or not the pneumatic cylinder 1 is in a normal state. In this state, the physical amount detection sensor 9 detects an external force generated between the mounting member 8 and the tube 4 when the pressure-receiving object 13 is pushed and pulled, and transmits the detected external force to the computation/storage/determination device 10. The computation/storage/determination processing device 10 compares the detected external force data with the standard external force data Fs stored therein.

The computation/storage/determination processing device 10 determines that the pneumatic cylinder 1 is in an abnormal state if the numerical value of the external force data that is being compared is lower than 90% of the numerical value of the standard external force data Fs in the contact step and the pressing step, and determines that the pneumatic cylinder 1 is in a normal state if it is at least 90% of the numerical value of the standard external force data Fs. This step is defined as the determination step.

The principle by which the pneumatic cylinder 1 is determined as being in an abnormal state if the numerical value of the external force data that is being compared is lower than 90% of the numerical value of the standard external force data Fs in the contact step and the pressing step makes use of the fact that, when a so-called lateral load is applied to the rod 2 in the pneumatic cylinder 1 in a direction different from the linear movement direction, an excessive lateral load is applied to some of the components in the pneumatic cylinder, and the numerical values of the external force data that are obtained decrease due to the loss of force in the contact step and the pressing step because of looseness arising from wear due to the application of excessive lateral loads to the rod 2, the gland packing 7, the piston 5, the packing 6 and the tube 4. The external force data in this case is shown in FIG. 17.

When the series of steps is performed and it is determined, in the determination step, that the pneumatic cylinder 1 is worn and in the abnormal state in this manner, an abnormality determination signal from the computation/storage/determination processing device 10 is sent to a PLC (not shown) and displayed on a display device (not shown). This step is defined as the display step.

FIG. 18 shows a flow chart of the wear detection method for a pneumatic cylinder 1 in the present first embodiment.

First, the external force generated between the mounting member 8 and the tube 4 when the pressure-receiving object 13 is pushed and pulled in a state without abnormalities is pre-detected by the physical amount detection sensor 9, and stored, as standard external force data, in the computation/storage/determination processing device 10 (step S1, storage step).

Next, the pneumatic cylinder 1 is actually used and actuated (step S3).

At this time, the external force generated between the mounting member 8 and the tube 4 when the pressure-receiving object 13 is pushed and pulled is detected by the physical amount detection sensor 9 (step S5, determination step), and it is computationally determined whether the linear actuator is in a normal state or an abnormal state by comparing the detected external force data with the standard external force data stored in the computation/storage/determination processing device 10 (step S7 and step S9, determination step).

If it is determined that the pneumatic cylinder 1 is in a normal state (step S9, Yes), then the procedure shifts to step S3 and the work is continued. If it is determined that the pneumatic cylinder 1 is in an abnormal state (step S9, No.), then this is displayed on the display device (step S11, display step).

Next, the effects of the above-described wear detection method and wear detection system for a linear actuator will be explained.

The wear detection method for a linear actuator 1 according to the present embodiment is a wear detection method for a linear actuator 1 that comprises a rod 2 capable of moving linearly inside a tube 4 mounted on a mounting member 8, and that pushes and pulls a pressure-receiving object 13 while a push-pull member 12 connected to the rod 2 applies a lateral load F in a direction different from the linear movement direction, comprising a storage step of pre-detecting, with a physical amount detection sensor 9, an external force generated between the mounting member 8 and the tube 4 when the pressure-receiving object 13 is pushed and pulled in a state without abnormalities, and storing the external force, as standard external force data, in a computation/storage/determination processing device 10; and a determination step of detecting, with the physical amount detection sensor 9, an external force generated between the mounting member 8 and the tube 4 when the pressure-receiving object 13 is pushed and pulled, and computationally determining whether the linear actuator 1 is in a normal state or an abnormal state by comparing the detected external force data with the standard external force data stored in the computation/storage/determination processing device 10.

Additionally, the wear detection system for a pneumatic cylinder 1 according to the present embodiment is a wear detection system for a linear actuator 1 that comprises a rod 2 capable of moving linearly inside a tube 4 mounted on a mounting member 8, and that pushes and pulls a pressure-receiving object 13 while a push-pull member 12 connected to the rod 2 applies a lateral load F in a direction different from the linear movement direction, comprising a physical amount detection sensor 9 that detects an external force generated between the mounting member 8 and the tube 4 when the pressure-receiving object 13 is pushed and pulled; and a computation/storage/determination processing device 10 that stores, as standard external force data, the external force detected by the physical amount detection sensor 9 in a state without abnormalities, and that computationally determines whether the linear actuator 1 is in a normal state or an abnormal state by comparing, with the standard external force data, the external force data detected in the physical amount detection sensor 9 when the pressure-receiving object 13 is pushed and pulled.

According to the above-mentioned structure and method, the determination step is performed each time the pneumatic cylinder 1 is actuated. As a result, when the wear on some of the components in the pneumatic cylinder 1 progresses and reaches a replacement criterion, the replacement timing is automatically and quickly made clear. As a result, it is possible to implement predictive maintenance such as replacement of a pneumatic cylinder 1 in a state of being worn by excessive lateral loads leads to many types of trouble, such as trouble in the equipment (not shown) in which the pneumatic cylinder 1 is installed itself, trouble along a line (not shown) including that equipment (not shown), or trouble in the quality of products (not shown) manufactured by using that equipment (not shown).

As mentioned above, in the present first embodiment, during the determination step, it is computationally determined whether or not the pneumatic cylinder is in the normal state or the abnormal state by comparing the detected external force data with stored standard external force data. In addition thereto, it is also possible to compare an average value Fa of external force data for an immediately preceding plurality of steps with the detected external force data F, to determine whether the pneumatic cylinder is in a normal state or an abnormal state based on whether the detected external force data F is outside a preset tolerance range with respect to the average value Fa.

For example, in the determination step, when the average value of the external force data during the immediately preceding 30 contact steps and pressing steps (the average value for n steps when there are only n (n<30) immediately preceding contact steps and pressing steps) is Fa, if Fa×1.01≤F or Fa×0.99≥F, then it is determined that the external force data F has suddenly changed, and thus that the pneumatic cylinder 1, the equipment in which the pneumatic cylinder 1 is installed, or the surrounding environment are in an abnormal state.

Thus, in the determination step, by comparing the latest external force data F with the average value Fa of the external force generated between the mounting member 8 and the tube 4 when the pressure-receiving object is pushed and pulled during the immediately preceding 30 steps, and determining that the linear actuator, the equipment in which the linear actuator is installed or the surrounding environment is in an abnormal state when the latest external force data F changes by at least 1% from the average external force value Fa, it is possible to detect the possibility of abnormalities other than wear in the linear actuator. As a result thereof, it is possible to separately detect whether an abnormality is definitely due to wear in the linear actuator alone or there is a possibility that the abnormality is due to another cause.

It is also possible to similarly apply this feature of determining whether the linear actuator is in a normal state or an abnormal state by comparing the average value Fa of the external force data for an immediately preceding plurality of steps with the detected external force data F to the other embodiments indicated below.

Second Embodiment

Next, a second embodiment of the present invention wherein the linear actuator is a hydraulic cylinder will be explained with reference to the drawings. As shown in FIGS. 9 and 10, the hydraulic cylinder 101, which is a linear actuator, comprises a linearly movable rod 102; a tube 104 having two oil spaces 103, i.e., a first oil space 103a and a second oil space 103b, in the interior thereof; a piston 105 that is joined to the rod 102 and that divides the oil space 103 into the first oil space 103a and the second oil space 103b; a packing 106 that is provided around the perimeter of the piston 105 so as to be able to slide along the inner walls of the tube 104, and that is arranged so that oil will not leak between the first oil space 103a and the second oil space 103b divided by the piston 105; a gland packing 107 that is provided on the side of the tube 104 from which the rod 102 protrudes, and that is arranged so as to allow the rod 102 to slide into and out of the interior of the tube 104 and so that oil in the first oil space 103a will not leak to the outside; a mounting member 108 for mounting and fixing the hydraulic cylinder 101 to a casing, a frame or the like in equipment in which it is to be provided; and a physical amount detection sensor 109 for detecting an external force generated between the mounting member 108 and the tube 104.

The tube 104 is provided with a first oil space oil supply hole 114a for supplying and discharging hydraulic oil with respect to the first oil space 103a and a second oil space oil supply hole 114b for supplying and discharging hydraulic oil with respect to the second oil space 103b.

It is preferable to use a force sensor as the physical amount detection sensor 109.

The wear detection system for the hydraulic cylinder 101 comprises a computation/storage/determination processing device 110 for performing computation, storage or determination processes using signals detected by the physical amount detection sensor 109. A signal line 111 for transmitting signals detected by the physical amount detection sensor 109 to the computation/storage/determination processing device 110 is connected between the physical amount detection sensor 109 and the computation/storage/determination processing device 110.

A push-pull member 112 is connected to the rod 102, and when a pressure-receiving object 113 is pushed or pulled by this push-pull member 112, a lateral force F is applied to the rod 102 in a direction different from the linear movement direction, as shown in FIG. 11.

In the state in which there are no abnormalities in the hydraulic cylinder 101, the external force that is generated, when pushing and pulling the pressure-receiving object 113, between the mounting member 108 for supporting the hydraulic cylinder 101 and the tube 104 on which the force of the rod 102 pushing and pulling the pressure-receiving object 113 acts is pre-detected by the physical amount detection sensor 109, and is stored in the computation/storage/determination processing device 110 as standard external force data Fs (storage step). Then, as the hydraulic cylinder 101 is repeatedly used, in a state in which it is unclear whether or not the hydraulic cylinder 101 is in a normal state, the external force that is generated between the mounting member 108 and the tube 104 when the pressure-receiving object 113 is pushed and pulled is detected by the physical amount detection sensor 109, and it is determined whether or not the hydraulic cylinder 101 is in a normal state or an abnormal state by comparing the detected external force data F with the standard external force data Fs stored in the computation/storage/determination processing device 110 (determination step), thus performing wear detection in the hydraulic cylinder 101, which is a linear actuator. The details of the actuation of the hydraulic cylinder in this second embodiment are the same as those in the first embodiment, so their explanation will be omitted.

Third Embodiment

Next, a third embodiment of the present invention wherein the linear actuator is an electric cylinder will be explained with reference to the drawings. As shown in FIGS. 12 and 13, the electric cylinder 201, which is a linear actuator, comprises a linearly movable rod 202; a tube 204 having, in the interior thereof, a receiving space that can be entered or exited by the rod 202; a ball screw 215 that is rotatably provided in the interior of the tube 204; a ball screw nut 216 that is moved linearly inside the tube 204 by rotating the ball screw 215; a mounting member 208 for mounting and fixing the electric cylinder 201 to a casing, a frame or the like in equipment in which it is to be provided; and a physical amount detection sensor 209 for detecting an external force generated between the mounting member 208 and the tube 204.

The wear detection system for the electric cylinder 201 comprises a computation/storage/determination processing device 210 for performing computation, storage or determination processes using signals detected by the physical amount detection sensor 209. A signal line 211 for transmitting signals detected by the physical amount detection sensor 209 to the computation/storage/determination processing device 210 is connected between the physical amount detection sensor 209 and the computation/storage/determination processing device 210.

A push-pull member 212 is connected to the rod 202, and when a pressure-receiving object 213 is pushed or pulled by this push-pull member 212, a lateral force F is applied to the rod 202 in a direction different from the linear movement direction, as shown in FIG. 14.

It is preferable to use a force sensor as the physical amount detection sensor 209.

In the state in which there are no abnormalities in the electric cylinder 201, the external force that is generated, when pushing and pulling the pressure-receiving object 213, between the mounting member 208 for supporting the electric cylinder 201 and the tube 204 on which the force of the rod 202 pushing and pulling the pressure-receiving object 213 acts is pre-detected by the physical amount detection sensor 209, and is stored in the computation/storage/determination processing device 210 as standard external force data (storage step). Then, as the electric cylinder 201 is repeatedly used, in a state in which it is unclear whether or not the electric cylinder 201 is in a normal state, the external force that is generated between the mounting member 208 and the tube 204 when the pressure-receiving object 213 is pushed and pulled is detected by the physical amount detection sensor 209, and it is determined whether or not the electric cylinder 201 is in a normal state or an abnormal state by comparing the detected external force data F with the standard external force data Fs stored in the computation/storage/determination processing device 210 (determination step), thus performing wear detection in the electric cylinder 201, which is a linear actuator.

In the electric cylinder according to this third embodiment, a forward rotation force supplied from a servomotor 217 which is a driving source causes forward rotation of a first pulley 218a, and the forward rotation force is transmitted from the first pulley 218a to a second pulley 218b via a transmission belt 219. The second pulley 218b is coupled so as to be able to rotate in unison with the ball screw 215, so the forward rotation force of the second pulley is transmitted directly to the ball screw 215. Due to the forward rotation of the ball screw 215, the ball screw nut 216 moves linearly towards the rod 202 inside the tube 204. The ball screw nut 216 is connected to the rod 202 so as to be able to move in unison therewith, so the linear driving force of the ball screw nut 216 is supplied to the rod 202 and the rod 202 extends so as to be pushed out from inside the tube 204. The details of the actuation of the electric cylinder in this third embodiment are also the same as those in the first embodiment, so their explanation will be omitted.

Modified Examples

The positions of the physical amount detection sensors 9, 109, 209 may be changed. For example, the shapes of the mounting members 8, 108, 208 may be changed as illustrated in FIG. 19 to FIG. 21, and the physical amount detection sensors 9, 109, 209 may be mounted behind the cylinders. Additionally, as illustrated in FIG. 22 to FIG. 24, the physical amount detection sensors 9, 109, 209 may be mounted at the tips of the rods 2, 102, 202, more specifically, between the push-pull members 12, 112, 212 and the rods 2, 102, 202. The mounting positions of the physical amount detection sensors 9, 109, 209 may be anywhere as long as they are positions at which external forces between the mounting members 8, 108, 208 and the tubes 4, 104, 204 can be detected, whether directly or indirectly.

REFERENCE SIGNS LIST

F Lateral load (external force data)
Fs Standard external force data
Fa Average value of external force data
1 Pneumatic cylinder (linear actuator)
2 Rod
3 Air space
3a First air space
3b Second air space
4 Tube
5 Piston
6 Packing
7 Gland packing
8 Mounting member (mounting flange)
9 Physical amount detection sensor
10 Computation/storage/determination processing device
11 Signal line
12 Push-pull member
13 Pressure-receiving object
14a First air space air supply hole
14b Second air space air supply hole
101 Hydraulic cylinder (linear actuator)
102 Rod
103 Oil space
103a First oil space
103b Second oil space
104 Tube
105 Piston
106 Packing
107 Gland packing
108 Mounting member (mounting flange)
109 Physical amount detection sensor
110 Computation/storage/determination processing device
111 Signal line
112 Push-pull member
113 Pressure-receiving object
114a First oil space oil supply hole
114b Second oil space oil supply hole
201 Electric cylinder (linear actuator)
202 Rod
204 Tube
208 Mounting member (mounting flange)
209 Physical amount detection sensor
210 Computation/storage/determination processing device
211 Signal line
212 Push-pull member
213 Pressure-receiving object
215 Ball screw
216 Ball screw nut
217 Servomotor
218a First pulley
218b Second pulley
219 Transmission belt

The invention claimed is:

1. A wear detection method for a linear actuator that comprises a rod capable of moving linearly inside a tube mounted on a mounting member, and that pushes and pulls a pressure-receiving object while a push-pull member connected to the rod applies a lateral load in a direction different from a linear movement direction, the wear detection method comprising:
  a storage step of pre-detecting, with a physical amount detection sensor, a first external force generated between the mounting member and the tube when the pressure-receiving object is pushed and pulled in a state without abnormalities, and storing the first external force, as standard external force data, in a computation/storage/determination processing device; and
  a determination step of detecting, with the physical amount detection sensor, a second external force generated between the mounting member and the tube when the pressure-receiving object is pushed and pulled, and computationally determining whether the linear actuator is in a normal state or an abnormal state by comparing the second external force with the standard external force data stored in the computation/storage/determination processing device.

2. The wear detection method for the linear actuator according to claim 1, wherein a force sensor is used as the physical amount detection sensor.

3. The wear detection method for the linear actuator according to claim 2, wherein, during the determination step, an average value of external force data for an immediately preceding plurality of steps is compared with the second external force, and the linear actuator is also determined as being in the abnormal state when the second external force is outside a preset tolerance range with respect to the average value.

4. The wear detection method for the linear actuator according to claim 1, wherein, during the determination step, an average value of external force data for an immediately preceding plurality of steps is compared with the second external force, and the linear actuator is also determined as being in an abnormal state when the second external force is outside a preset tolerance range with respect to the average value.

5. A wear detection system for a linear actuator that comprises a rod capable of moving linearly inside a tube mounted on a mounting member, and that pushes and pulls a pressure-receiving object while a push-pull member connected to the rod applies a lateral load in a direction different from a linear movement direction, the wear detection system comprising:
  a physical amount detection sensor that detects a first external force generated between the mounting member and the tube when the pressure-receiving object is pushed and pulled; and
  a computation/storage/determination processing device that stores, as standard external force data, a second external force detected by the physical amount detection sensor in a state without abnormalities, and that computationally determines whether the linear actuator is in a normal state or an abnormal state by comparing, with the standard external force data, the first external force detected in the physical amount detection sensor when the pressure-receiving object is pushed and pulled.

6. The wear detection system for the linear actuator according to claim 5, wherein the physical amount detection sensor is a force sensor.

7. The wear detection system for the linear actuator according to claim 6, wherein the linear actuator is a pneumatic cylinder, a hydraulic cylinder or an electric cylinder.

8. The wear detection system for the linear actuator according to claim 5, wherein the linear actuator is a pneumatic cylinder, a hydraulic cylinder or an electric cylinder.

\* \* \* \* \*